US010430318B1

(12) United States Patent
Ansari et al.

(10) Patent No.: US 10,430,318 B1
(45) Date of Patent: Oct. 1, 2019

(54) SYSTEMS AND METHODS FOR EFFICIENTLY PERFORMING REGRESSION TESTING ON SOFTWARE UPDATES

(71) Applicant: Juniper Networks, Inc., Sunnyvale, CA (US)

(72) Inventors: Omar Shihadeh Ansari, Fremont, CA (US); Chi-Hung Chan, San Ramon, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 136 days.

(21) Appl. No.: 15/646,316

(22) Filed: Jul. 11, 2017

(51) Int. Cl.
 *G06F 11/36* (2006.01)
 *G06F 8/65* (2018.01)

(52) U.S. Cl.
 CPC ........ *G06F 11/368* (2013.01); *G06F 11/3676* (2013.01); *G06F 11/3688* (2013.01); *G06F 8/65* (2013.01)

(58) Field of Classification Search
 CPC .... G06F 11/36; G06F 11/362; G06F 11/3664; G06F 11/3668; G06F 11/3672; G06F 11/3692; G06F 11/3696
 USPC .................................................. 717/124–135
 See application file for complete search history.

(56) References Cited

U.S. PATENT DOCUMENTS

| | | | |
|---|---|---|---|
| 5,828,883 A * | 10/1998 | Hall .................... | G06F 11/3409 717/133 |
| 6,857,120 B1 * | 2/2005 | Arnold ................. | G06F 9/4484 717/157 |
| 7,167,870 B2 * | 1/2007 | Awari ................. | G06F 11/3676 707/609 |
| 8,276,123 B1 * | 9/2012 | Deng .................. | G06F 11/3688 714/37 |
| 8,561,036 B1 * | 10/2013 | Beans ................... | G06F 11/368 717/124 |
| 8,566,813 B2 * | 10/2013 | Kwon .................... | G06F 8/443 717/131 |

(Continued)

OTHER PUBLICATIONS

B. Jiang, Y. Mu and Z. Zhang, "Research of Optimization Algorithm for Path-Based Regression Testing Suit," 2010 Second International Workshop on Education Technology and Computer Science, Wuhan, 2010, pp. 303-306. (Year: 2010).*

(Continued)

*Primary Examiner* — Andrew M. Lyons
(74) *Attorney, Agent, or Firm* — FisherBroyles, LLP

(57) ABSTRACT

The disclosed method may include (1) identifying a software update that includes at least one software function that has changed since a previous software update, (2) determining, based at least in part on the software update, one or more call paths that include (A) the software function that has changed since the previous software update and (B) at least one additional software function, (3) mapping the changed software function to one or more test scripts, (4) mapping the additional software function to one or more additional test scripts, (5) identifying at least one test script that is commonly mapped to both the changed software function and the additional software function, and then (6) performing a regression test by executing the test script that is mapped to both the changed software function and the additional software function. Various other systems, methods, and computer-readable media are also disclosed.

19 Claims, 9 Drawing Sheets

(56) References Cited

U.S. PATENT DOCUMENTS

| | | | | |
|---|---|---|---|---|
| 8,683,441 | B2* | 3/2014 | Keidar-Barner | G06F 9/44589 717/124 |
| 8,806,450 | B1* | 8/2014 | Maharana | G06F 11/3688 717/133 |
| 8,966,453 | B1* | 2/2015 | Zamfir | G06F 11/3604 714/38.1 |
| 8,972,946 | B2* | 3/2015 | Bullard | G06F 11/368 717/125 |
| 9,195,476 | B2 | 11/2015 | Liem | |
| 9,317,410 | B2* | 4/2016 | Eilam | G06F 11/3688 |
| 9,424,006 | B2 | 8/2016 | Abadi et al. | |
| 9,442,830 | B1* | 9/2016 | Zhang | G06F 11/3688 |
| 9,483,387 | B1* | 11/2016 | Allocca | G06F 11/3688 |
| 9,983,989 | B1* | 5/2018 | Li | G06F 11/3692 |
| 2005/0166094 | A1* | 7/2005 | Blackwell | G06F 11/3664 714/38.14 |
| 2006/0070048 | A1* | 3/2006 | Li | G06F 11/3676 717/144 |
| 2007/0006043 | A1* | 1/2007 | Pins | G06F 11/3688 714/38.14 |
| 2007/0074189 | A1* | 3/2007 | Srinivas | G06F 11/3612 717/144 |
| 2008/0209276 | A1* | 8/2008 | Stubbs | G06F 11/3688 714/38.14 |
| 2008/0222614 | A1* | 9/2008 | Chilimbi | G06F 11/3447 717/130 |
| 2009/0199161 | A1* | 8/2009 | Cutler | G06F 11/366 717/124 |
| 2011/0161936 | A1* | 6/2011 | Huang | G06F 11/3688 717/130 |
| 2012/0011493 | A1* | 1/2012 | Singh | G06F 8/75 717/168 |
| 2012/0192153 | A1* | 7/2012 | Venkatraman | G06F 11/3664 717/124 |
| 2012/0266136 | A1* | 10/2012 | Brown | G06F 11/3664 717/124 |
| 2014/0040869 | A1* | 2/2014 | Park | G06F 11/3612 717/133 |
| 2014/0165043 | A1* | 6/2014 | Pasala | G06F 11/3684 717/124 |
| 2015/0007146 | A1* | 1/2015 | Li | G06F 11/3684 717/130 |
| 2015/0033212 | A1* | 1/2015 | Mizobuchi | G06F 11/3688 717/131 |
| 2015/0106794 | A1* | 4/2015 | Rhee | G06F 11/3419 717/133 |
| 2016/0034382 | A1* | 2/2016 | Kumar | G06F 11/3676 717/124 |
| 2017/0139819 | A1* | 5/2017 | D'Andrea | G06F 11/3688 |
| 2017/0351598 | A1* | 12/2017 | Rauenzahn | G06F 11/3688 |
| 2018/0052764 | A1* | 2/2018 | Kaser | G06F 11/3684 |
| 2018/0157581 | A1* | 6/2018 | Beard | G06F 11/3664 |

OTHER PUBLICATIONS

D. Suleiman, M. Alian and A. Hudaib, "A survey on prioritization regression testing test case," 2017 8th International Conference on Information Technology (ICIT), Amman, 2017, pp. 854-862. (Year: 2017).*

Z. Zhang, Y. Mu and Y. Tian, "Test Case Prioritization for Regression Testing Based on Function Call Path," 2012 Fourth International Conference on Computational and Information Sciences, Chongqing, 2012, pp. 1372-1375. (Year: 2012).*

* cited by examiner

Mapping
500

| Function | Test Scripts |
|---|---|
| Fm | S1, S4, S33 |
| Fn | S4, S10, S20, S33, S44 |
| Fs | S4, S8, S9, S10, S20 |
| Ft | S1, S11, S12, S13, S22, S28, S30 |
| Fq | S4, S7, S10, S15, S18, S20 |
| F7 | S6, S13, S22, S28, S40, S44 |
| F8 | S5, S6, S7, S10, S11, S30 |
| F9 | S1, S7, S8, S15, S30, S40, S41, S42 |
| F10 | S1, S4, S6, S10, S12, S15, S20, S30 |
| CF | S4, S10, S20, S30, S33, S40, S50, S51 |

FIG. 5

SYSTEMS AND METHODS FOR EFFICIENTLY PERFORMING REGRESSION TESTING ON SOFTWARE UPDATES

BACKGROUND

Software updates often necessitate extensive testing to ensure that changes introduced by such updates work properly and/or do not cause pre-existing software functions to malfunction. For example, a software vendor may develop a network operating system that runs on various network devices (such as routers). In this example, prior to the release of an update to the network operating system, the software vendor may perform rigorous regression testing to validate any changes introduced by the update. As part of this regression testing, the software vendor may execute a specific set of scripts designed to determine whether the software update works as intended.

In some examples, the selection of these scripts may be based on an algorithm that searches for scripts with maximum line coverage of the software functions that have changed since the previous update. Unfortunately, this algorithm for selecting the set of scripts may have a few drawbacks, inefficiencies, and/or shortcomings. For example, the selected set of scripts may focus almost entirely on changed software functions, thereby potentially neglecting certain collateral functions affected by the changed software functions. Additionally or alternatively, the selected set of scripts may take a long time to fully execute and/or include certain redundancies that are unnecessary for the regression testing.

The instant disclosure, therefore, identifies and addresses a need for improved and/or additional systems and methods for efficiently performing regression testing on software updates.

SUMMARY

As will be described in greater detail below, the instant disclosure generally relates to systems and methods for efficiently performing regression testing on software updates. In one example, a computer-implemented method for accomplishing such a task may include (1) identifying a software update that includes at least one software function that has changed since a previous software update, (2) determining, based at least in part on the software update, one or more call paths that include (A) the software function that has changed since the previous software update and (B) at least one additional software function, (3) mapping the changed software function to one or more test scripts that facilitate verifying whether the changed software function performs a certain task despite having changed since the previous software update, (4) mapping the additional software function to one or more additional test scripts that facilitate verifying whether the additional software function performs a specific task even though the changed software function has changed since the previous software update, (5) identifying at least one test script that is common to both the test scripts mapped to the changed software function and the additional test scripts mapped to the additional software function, and then (6) performing a regression test on the changed software function and the additional software function by executing the test script that is mapped to both the changed software function and the additional software function.

Similarly, a system incorporating the above-described method may include various modules that are stored in memory and/or executed by a physical processor. For example, such a system may include (1) an identification module that identifies a software update that includes at least one software function that has changed since a previous software update, (2) a determination module that determines, based at least in part on the software update, one or more call paths that include (A) the software function that has changed since the previous software update and (B) at least one additional software function, (3) a mapping module that (A) maps the changed software function to one or more test scripts that facilitate verifying whether the changed software function performs a certain task despite having changed since the previous software update and (B) maps the additional software function to one or more additional test scripts that facilitate verifying whether the additional software function performs a specific task even though the changed software function has changed since the previous software update, (4) wherein the identification module identifies at least one test script that is common to both the test scripts mapped to the changed software function and the additional test scripts mapped to the additional software function, and (5) a testing module that performs a regression test on the changed software function and the additional software function by executing the test script that is mapped to both the changed software function and the additional software function.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a software update that includes at least one software function that has changed since a previous software update, (2) determine, based at least in part on the software update, one or more call paths that include (A) the software function that has changed since the previous software update and (B) at least one additional software function, (3) map the changed software function to one or more test scripts that facilitate verifying whether the changed software function performs a certain task despite having changed since the previous software update, (4) map the additional software function to one or more additional test scripts that facilitate verifying whether the additional software function performs a specific task even though the changed software function has changed since the previous software update, (5) identify at least one test script that is common to both the test scripts mapped to the changed software function and the additional test scripts mapped to the additional software function, and then (6) perform a regression test on the changed software function and the additional software function by executing the test script that is mapped to both the changed software function and the additional software function.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

FIG. 5 is an illustration of an exemplary mapping of software functions to test scripts.

Figure 1:
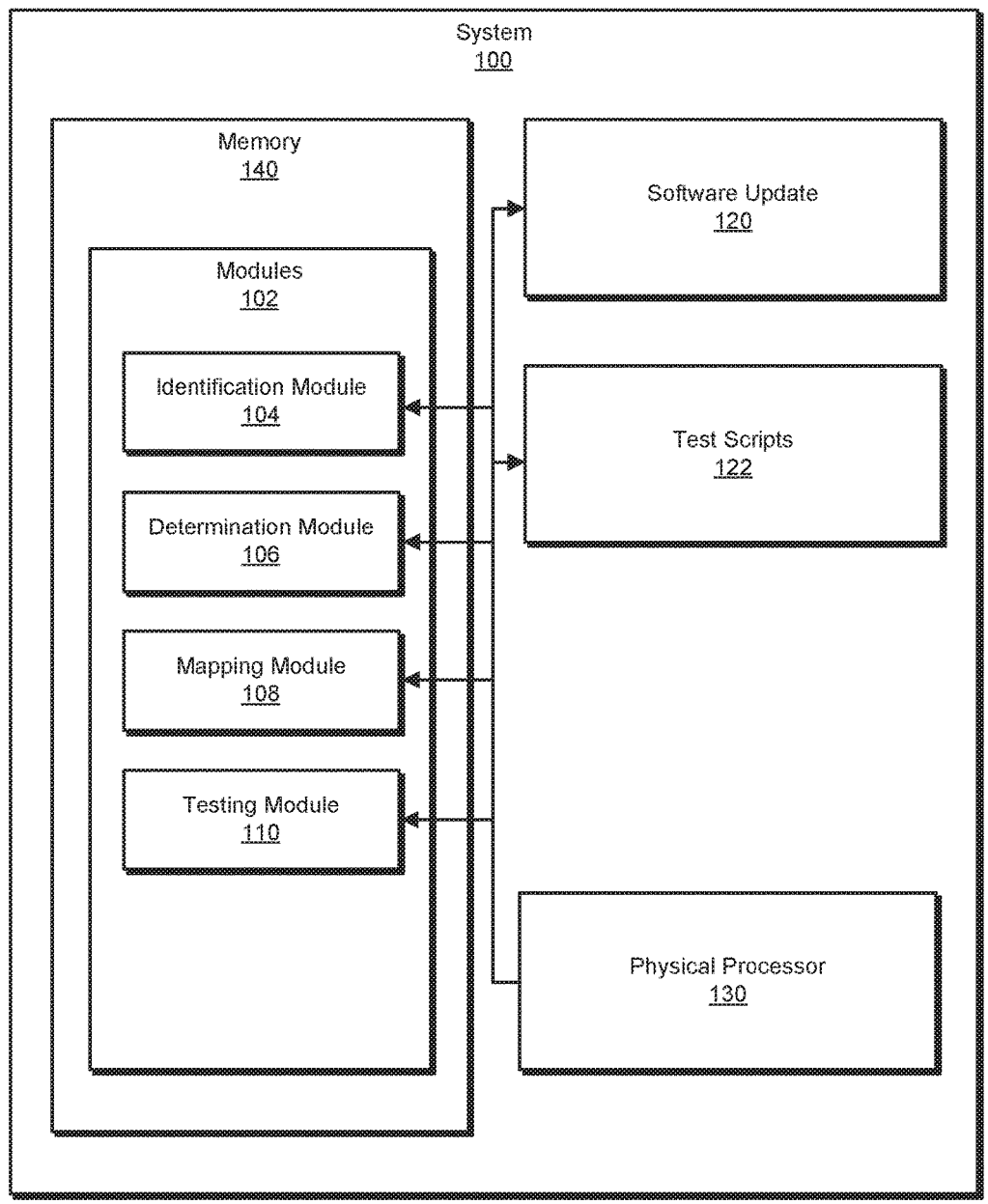
FIG. 1 is a block diagram of an exemplary system for efficiently performing regression testing on software updates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for efficiently performing regression testing on software updates. As will be explained in greater detail below, embodiments of the instant disclosure may facilitate efficient regression testing that focuses not only on changed software functions but also on collateral functions affected by the changed software functions. In other words, embodiments of the instant disclosure may enable regression tests to have fuller coverage to ensure that both the changed software functions and all other software functions included in call paths of the changed software functions work properly. Additionally or alternatively, embodiments of the instant disclosure may consolidate certain redundancies in regression tests, thereby making such tests more efficient and/or less time-consuming.

Figure 2:
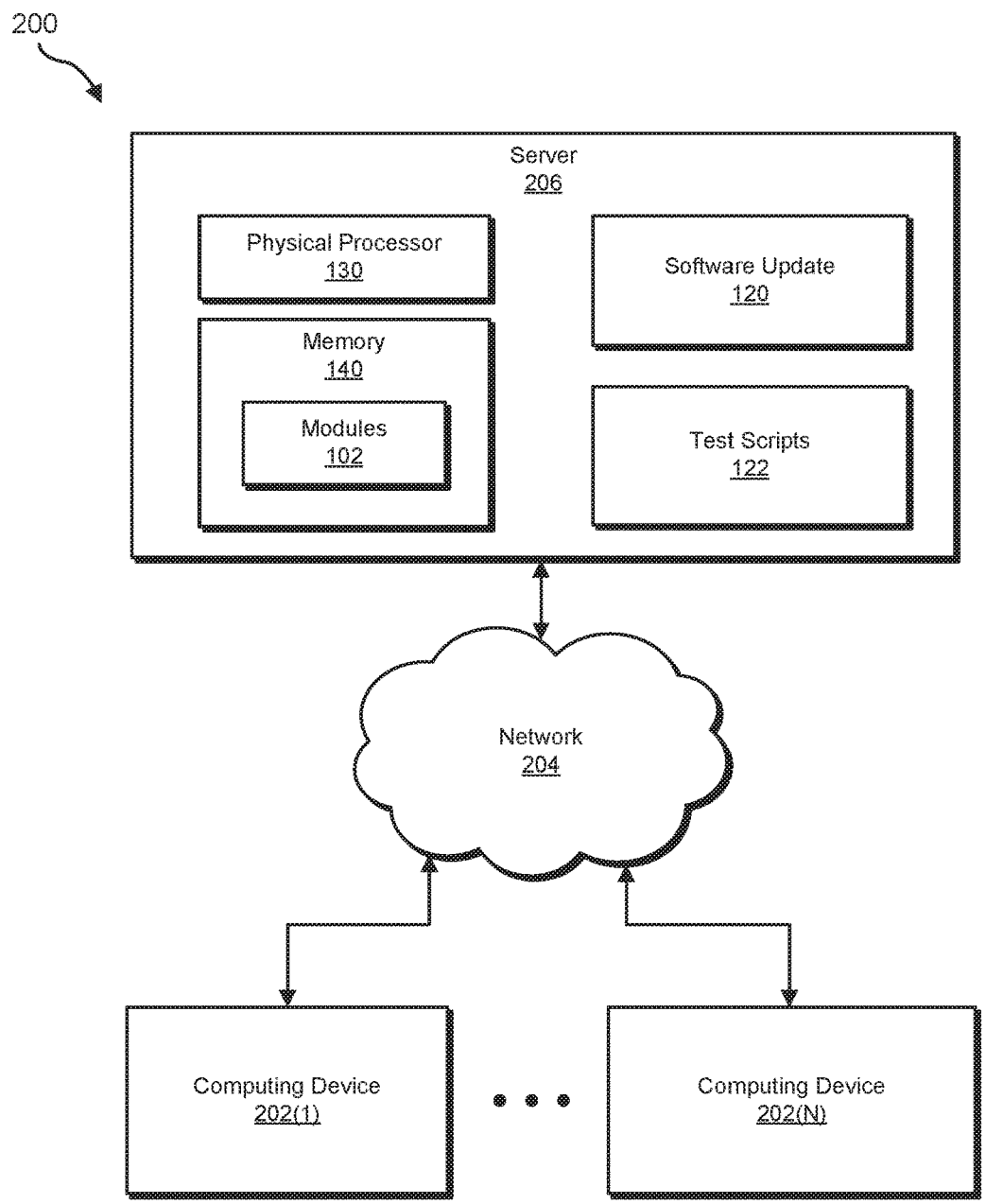
FIG. 2 is a block diagram of an exemplary system for efficiently performing regression testing on software updates.

The following will provide, with reference to FIGS. 1 and 2, examples of exemplary systems for efficiently performing regression testing on software updates. Detailed descriptions of corresponding computer-implemented methods will be provided in connection with FIG. 3. Detailed descriptions of an exemplary software update, an exemplary mapping, exemplary call paths, exemplary optimized per-path script sets, and an exemplary call graph will be provided in connection with FIGS. 4, 5, 6, 7, and 8, respectively. Finally, detailed descriptions of an exemplary computing system capable of implementing one or more of the embodiments described herein will be provided in connection with FIG. 9.

FIG. 1 is a block diagram of an exemplary system 100 for efficiently performing regression testing on software updates. As illustrated in this figure, exemplary system 100 may include one or more modules 102 for performing one or more tasks. As will be explained in greater detail below, modules 102 may include an identification module 104, a determination module 106, a mapping module 108, and a testing module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., server 206 and/or one or more of computing devices 202(1)-(N)). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate efficiently performing regression testing on software updates. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more software updates, such as software update 120. In some examples, software update 120 may include and/or represent an update to a software product that was previously released and/or deployed. For example, software update 120 may include and/or represent a new release or version of an existing software product. Additionally or alternatively, software update 120 may include and/or represent a fix, patch, and/or improvement to an existing software product.

In some examples, software update 120 may include various software functions. The term "software function," as used herein, generally refers to any type or form of routine, subroutine, and/or method included in a software update. In one example, software update 120 may include one or more software functions that have changed since the last software update of the software product in question. In another example, software update 120 may include one or more software functions that have remained unchanged and/or remained the same since the last software update of the software product in question.

As illustrated in FIG. 1, exemplary system 100 may also include test scripts, such as test scripts 122. In some examples, test scripts 122 may include and/or represent a set of instructions designed to test the software functions associated with and/or included in a software product. For example, one or more of test scripts 122 may be executed to test whether the software functions included in software update 120 still work properly despite certain changes made to the code of the software product. In this example, test scripts 122 may represent part of a regression test performed on software update 120 prior to its rollout and/or release.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include computing devices 202(1)-(N) in communication with a server 206 via a network 204. In one example, all or a portion of the functionality of modules 102 may be performed by one or more of computing devices 202(1)-(N), server 206, and/or any other suitable computing system. As will be described in greater detail below, one or more of modules 102 from FIG. 1 may, when executed by at least one processor of computing devices 202(1)-(N) and/or server 206, enable computing devices 202(1)-(N) and/or server 206 to efficiently perform regression testing on software updates.

For example, and as will be described in greater detail below, one or more of modules 102 may cause server 206 to (1) identify a software update that includes at least one software function that has changed since a previous software update, (2) determine, based at least in part on the software update, one or more call paths that include (A) the software function that has changed since the previous software update and (B) at least one additional software function, (3) map the changed software function to one or more test scripts that facilitate verifying whether the changed software function performs a certain task despite having changed since the previous software update, (4) map the additional software function to one or more additional test scripts that facilitate verifying whether the additional software function performs a specific task even though the changed software function has changed since the previous software update, (5) identify at least one test script that is common to both the test scripts mapped to the changed software function and the additional test scripts mapped to the additional software function, and then (6) perform a regression test on the changed software function and the additional software function by executing the test script that is mapped to both the changed software function and the additional software function.

Computing devices 202(1)-(N) generally represent any type or form of computing device capable of reading computer-executable instructions. In one example, computing devices 202(1)-(N) may include and/or represent client devices and/or network devices that implement and/or use a software product for which software update 120 is intended. Additionally or alternatively, computing devices 202(1)-(N) may include and/or represent client devices on which portions of software update 120 were developed. Additional examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, routers (such as provider edge routers, hub routers, spoke routers, autonomous system boundary routers, and/or area border routers), switches, hubs, modems, bridges, repeaters, gateways, multiplexers, network adapters, network interfaces, variations or combinations of one or more of the same, and/or any other suitable computing devices.

Server 206 generally represents any type or form of computing device capable of performing regression testing on software updates. In one example, server 206 may include and/or represent a security server that manages and/or oversees the testing of certain software updates. Additional examples of server 206 include, without limitation, application servers, web servers, storage servers, and/or database servers configured to run certain software applications and/or provide various web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing devices 202(1)-(N) and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although computing devices 202(1)-(N) and server 206 are illustrated as being external to network 204 in FIG. 2, these devices may alternatively represent part of and/or be included in network 204.

Figure 3:
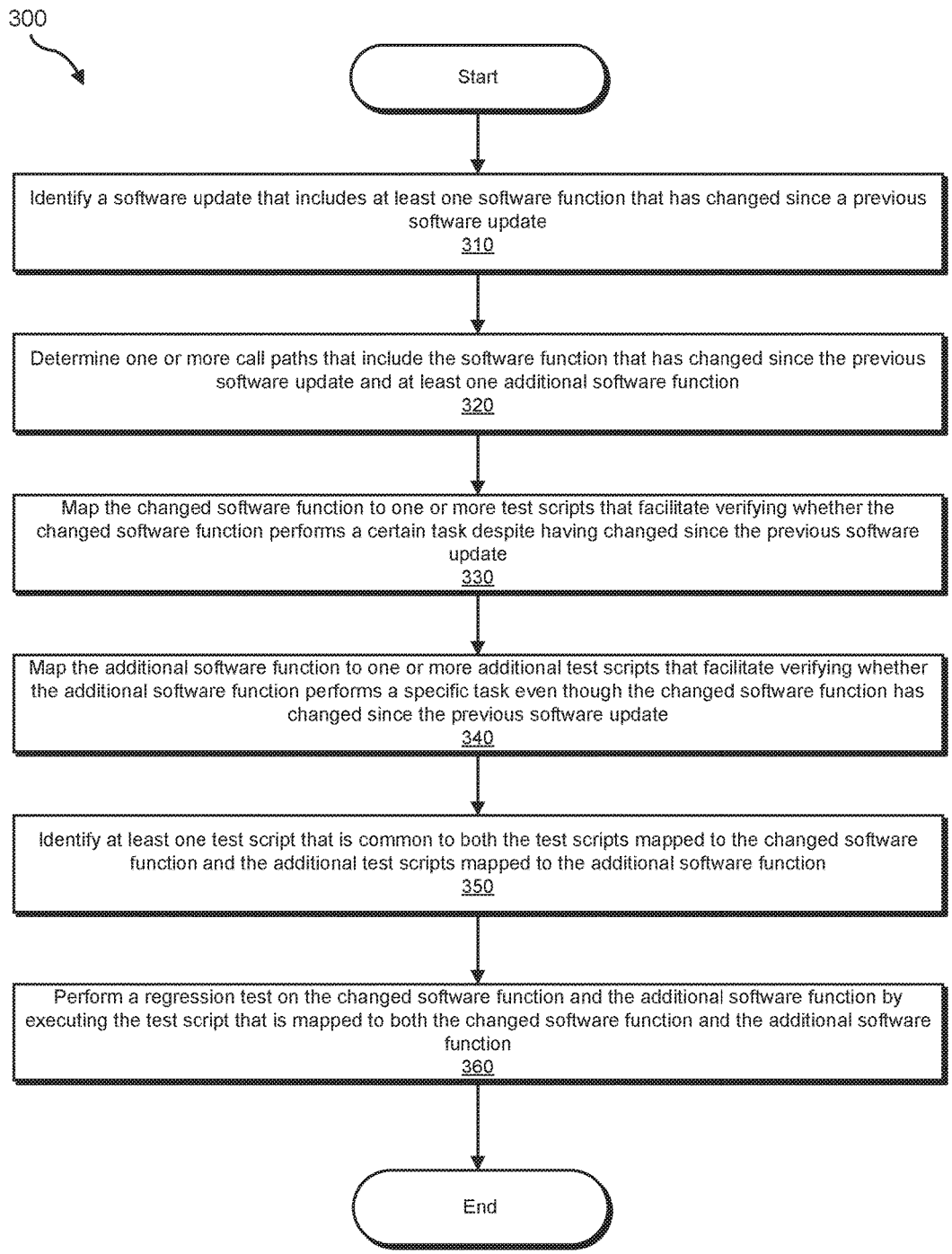
FIG. 3 is a flow diagram of an exemplary method for efficiently performing regression testing on software updates.

FIG. 3 is a flow diagram of an example computer-implemented method 300 for efficiently performing regression testing on software updates. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a software update that includes at least one software function that has changed since a previous software update. For example, identification module 104 may, as part of server 206 in FIG. 2, identify software update 120 that includes at least one software function that has changed since the last software update for the corresponding software product. In this example, software update 120 may also include various other software functions that have remained the same and/or unchanged since the last software update.

The systems described herein may perform step 310 in a variety of ways and/or contexts. In some examples, identification module 104 may identify software update 120 prior to the release of software update 120. For example, software engineers responsible for updating the corresponding software product may develop one or more changes and/or commits to the software product. In this example, the software engineers may gather the collection of changes and/or commits and then generate software update 120 based at least in part on those changes and/or commits.

In some examples, identification module 104 may identify software update 120 as software update 120 is submitted for regression testing. For example, server 206 may receive software update 120 as submitted by a software engineer for regression testing. In this example, upon receiving software update 120, server 206 may identify software update 120 to begin the process of developing and/or devising a sufficient regression test specifically for software update 120.

Returning to FIG. 3, at step 320 one or more of the systems described herein may determine one or more call paths that include the software function that has changed since the previous software update and at least one additional software function. For example, determination module 106 may, as part of server 206 in FIG. 2, determine one or more call paths that include the changed software function and at least one additional software function. The term "call path," as used herein, generally refers to any sequence of software functions that are executed as a result of calling an initial software function.

The systems described herein may perform step 320 in a variety of ways and/or contexts. In some examples, determination module 106 may determine the call paths by analyzing software update 120. For example, identification module 106 may identify all the changed software functions included in software update 120. After these changed software functions are identified, determination module 106 may determine which other software functions included in software update 120 are either directly or indirectly called by the changed software functions. In addition, determination module 106 may determine which other software functions included in software update 120 either directly or indirectly call the changed software functions.

As a specific example, a changed function "CF" may include a nested call to software function "F1". In this example, software function "F1" may include a nested call to a software function "F2". However, software function "F2" may fail to include any nested calls to further software functions. As a result, upon identifying these relationships among "CF", "F1", and "F2," determination module 106 may determine that "CF→F1→F2" represents a call path that includes the changed function and at least one additional software function. In this "CF→F1→F2" call path, "CF" may represent the caller function. In other words, "CF" may represent the first software function invoked when the call path is executed.

As another example, the changed function "CF" may be called by software function "Fb". In this example, software function "Fb" may be called by a software function "Fa". However, software function "Fa" may fail to be called by any further software functions. As a result, upon identifying these relationships among "CF", "Fb", and "Fa," determination module 106 may determine that "Fa→Fb→CF" represents a call path that includes the changed function and at least one additional software function. In this "Fa→Fb→CF" call path, "CF" may represent the callee function. In other words, "CF" may represent the last software function invoked when the call path is executed.

Figure 4:
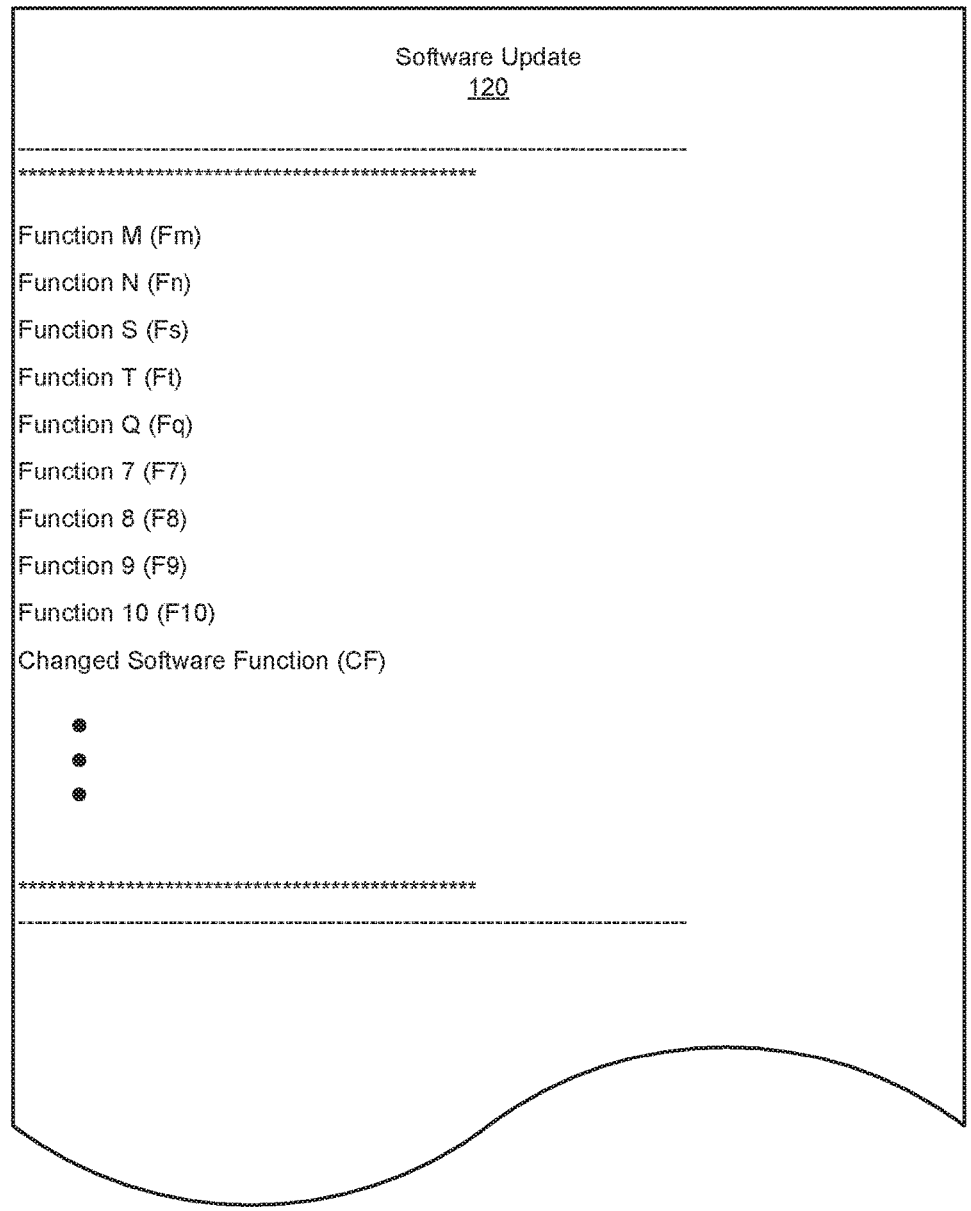
FIG. 4 is an illustration of an exemplary software update.

In one example, identification module 104 may identify software update 120 in FIG. 4. As illustrated in FIG. 4, software update 120 may include and/or represent functions "Fm", "Fn", "Fs", "Ft", "Fq", "F7", "F8", "F9", "F10", and "CF". Software update 120 may also include and/or represent various other functions not explicitly illustrated in FIG. 4. In this example, "CF" may represent the changed software function, and "Fm," "Fn," "Fs," "Ft," "Fq," "F7," "F8," "F9," and "F10" may represent other software functions (whether changed or unchanged since the last software update). Identification module 104 may identify those functions as being part of software update 120.

Figure 6:
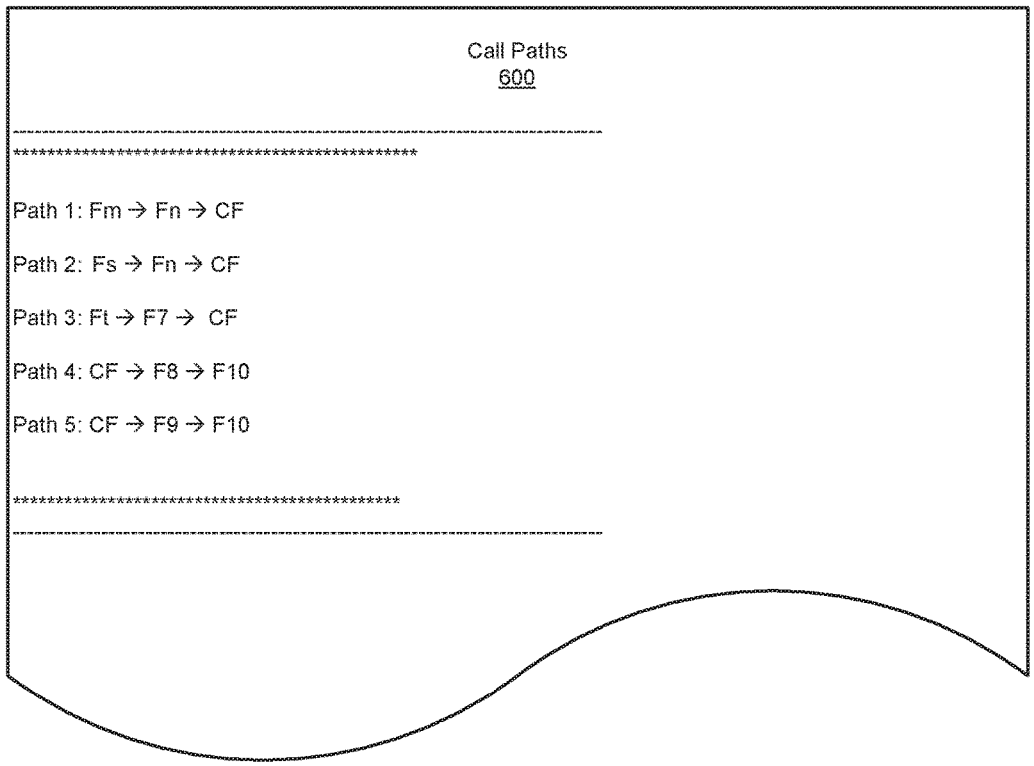
FIG. 6 is an illustration of exemplary call paths of certain functions included in a software update.

After the identification of those functions, determination module 106 may determine call paths 600 in FIG. 6 in connection with software update 120 in FIG. 4. As illustrated in FIG. 6, call paths 600 may include path 1 (in this example, "Fm→Fn→CF"), path 2 (in this example, "Fs→Fn→CF"), path 3 (in this example, "Ft→F7→CF"), path 4 (in this example, "CF→F8→F10"), and path 5 (in this example, "CF→F9→F10"). Call paths 600 may also include various other call paths not explicitly illustrated in FIG. 6.

Returning to FIG. 3, at step 330 one or more of the systems described herein may map the changed software function to one or more test scripts that facilitate verifying whether the changed software function performs a certain task despite having changed since the previous software update. For example, mapping module 108 may, as part of server 206 in FIG. 2, map the changed software function to one or more of test scripts 122. In this example, the mapped test scripts may facilitate verifying whether the changed software function still works properly and/or as expected or intended despite having changed since the last software update.

In other words, the execution of any one of the mapped test scripts may produce results that indicate and/or suggest whether the changed software function still works properly and/or as expected or intended. Accordingly, the mapped test scripts may all cover the changed software function, among other software functions potentially. As a result, the mapped test scripts may be at least partially redundant with respect to one another.

The systems described herein may perform step 330 in a variety of ways and/or contexts. In some examples, mapping module 108 may map the changed software function to the applicable test scripts by identifying each test script that is capable of producing results that indicate and/or suggest whether the changed software function still works properly and/or as expected or intended. In one example, mapping module 108 may form a list of all the test scripts that, if individually executed, would each test whether the changed software function still works properly and/or as expected or intended.

Returning to FIG. 3, at step 340 one or more of the systems described herein may map the additional software function to one or more additional test scripts that facilitate verifying whether the additional software function performs a specific task even though the changed software function has changed since the previous software update. For example, mapping module 108 may, as part of server 206 in FIG. 2, map the additional software function to one or more of test scripts 122. In this example, the mapped test scripts may facilitate verifying whether the additional software function still works properly and/or as expected or intended even though the changed software function has changed since the last software update.

In other words, the execution of any one of the mapped test scripts may produce results that indicate and/or suggest whether the additional software function still works properly and/or as expected or intended. Accordingly, the mapped test scripts may all cover the additional software function, among other software functions potentially. As a result, the mapped test scripts may be at least partially redundant with respect to one another.

The systems described herein may perform step 340 in a variety of ways and/or contexts. In some examples, mapping module 108 may map the additional software function to the applicable test scripts by identifying each test script that is capable of producing results that indicate and/or suggest whether the additional software function still works properly and/or as expected or intended. In one example, mapping module 108 may form a list of all the test scripts that, if individually executed, would each test whether the additional software function still works properly and/or as expected or intended.

As a specific example, mapping module 108 may create a mapping 500 in FIG. 5. As illustrated in FIG. 5, mapping 500 may identify (1) test scripts "S1", "S4", and "S33" as applying to "Fm", (2) test scripts "S4", "S10", "S20", "S33", and "S44" as applying to "Fn", (3) test scripts "S4", "S8", "S9", "S10", and "S20" as applying to "Fs", (4) test scripts "S1", "S11", "S12", "S13", "S22", "S28", and "S30" as applying to "Ft", (5) test scripts "S4", "S7", "S10", "S15", "S18", and "S20" as applying to "Fq", (6) test scripts "S6", "S13", "S22", "S28", "S40" and "S44" as applying to "F7", (7) test scripts "S5", "S6", "S7", "S10", "S11", and "S30" as applying to "F8", (8) test scripts "S1", "S7", "S8", "S15", "S30", "S40", "S41", and "S42" as applying to "F9", (9) test scripts "S1", "S4", "S6", "S10", "S12", "S15", "S20", and "S30" as applying to "F10", and (10) test scripts "S4", "S10", "S20", "S30", "S33", "S40", "S50", and "S51" as applying to "CF".

Returning to FIG. 3, at step 350 one or more of the systems described herein may identify at least one test script that is common to both the test scripts mapped to the changed software function and the additional test scripts mapped to the additional software function. For example, identification module 104 may, as part of server 206 in FIG. 2, identify at least one test script that is common to the changed software function and the additional software function in the mapping. In other words, identification module 104 may identify at least one test script that applies to both the changed software function and the additional software function. Additionally or alternatively, identification module 104 may identify at least one test script that is capable of producing results that indicate whether both the changed software function and the additional software function still work properly in software update 120.

Figure 7:
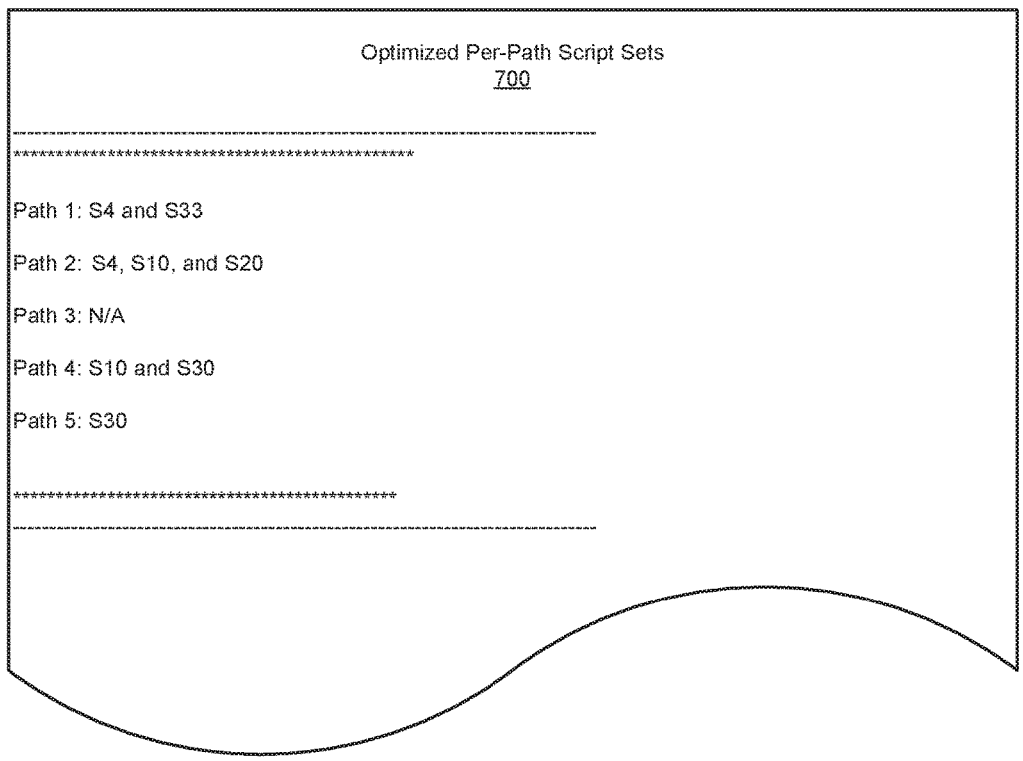
FIG. 7 is an illustration of an exemplary call graph that shows the calling relationships of certain functions included in a software update.

The systems described herein may perform step 350 in a variety of ways and/or contexts. In some examples, identification module 104 may identify the common test script by performing a logical union operation on the mappings corresponding to the changed software function and the additional software function. As a specific example, identification module 104 may identify the test scripts that commonly apply to call paths 600 in FIG. 6. In this example, identification module 104 and/or mapping module 108 may generate and/or formulate optimized per-path script sets 700 in FIG. 7. As illustrated in FIG. 7, optimized per-path script sets 700 may identify test scripts "S4" and "S33" as applying to each software function included in path 1, test scripts "S4", "S10" and "S20" as applying to each software function included in path 2, no test scripts as applying to each software function included in path 3, test scripts "S10" and "S30" as applying to each software function included in path 4, and test script "S30" as applying to each software function included in path 5.

Continuing with this example, optimized per-path script sets 700 may include and/or represent test scripts that, if executed individually, would each produce results that indicate and/or suggest whether any of the software functions within the corresponding path are no longer working properly in software update 120. For example, testing module 110 may test the functionality of all of software functions "Fm", "Fn", and "CF" in path 1 by executing just test script "S4". Alternatively, testing module 110 may test the functionality of all of software functions "Fm", "Fn", and "CF" in path 1 by executing just test script "S33".

In some examples, identification module 104 may identify and/or select the test script that is most commonly mapped to call paths 600 in FIG. 6. In other words, identification module 104 may identify the test scripts, from optimized per-path script sets 700 in FIG. 7, that are most common across the call paths. For example, test script "S4" is common to both path 1 and path 2. In addition, test script "S30" is common to both path 4 and path 5. Accordingly, testing module 110 may be able to test all the software functions included in paths 1 and 2 by executing just script "S4" and also test all the software functions included in paths 4 and 5 by executing just "S30".

In one example, determination module 106 may determine that test scripts "S4" and "S30" are most commonly mapped to call paths 600 in FIG. 6. As a result, identification module 104 may select test scripts "S4" and "S30" to be executed as part of a regression test performed on software update 120.

In some examples, the systems described herein may be able to consolidate the test scripts needed to validate call paths 600 in FIG. 6 with the test scripts needed to validate other call paths that involve another changed function. For example, determination module 106 may determine other call paths (not illustrated in FIG. 6) that include another software function "CF2" that has changed since the last software update. One of these other call paths may include functions "CF2", "F17", and "F21". In this example, mapping module 108 may map these software functions to test scripts that facilitate verifying whether these software functions still work properly in software update 120 despite the changes made to "CF2".

Identification module 104 may then identify and/or select at least one test script that is commonly mapped to all of functions "CF2", "F17", and "F21". For example, identification module 104 may identify test scripts "S4" and "S7" as being commonly mapped to all of functions "CF2", "F17", and "F21". Since, in this example, test script "S4" is commonly mapped not only to all the functions included in this other call path but also to paths 1 and 2 from call paths 600 in FIG. 6, identification module 104 may identify test script "S4" as being the most commonly mapped test script among those call paths, thereby making test script "S4" the most efficient and/or widely applicable among or across those call paths. As a result, testing module 110 may be able to test all the software functions included in this other call path and all the software functions included in paths 1 and 2 from call paths 600 in FIG. 6 by executing just script "S4".

In some examples, identification module 104 may optimize the regression testing by refusing to execute certain test scripts due at least in part to redundancies identified among test scripts 122. For example, identification module 104 may identify both "S4" and "S33" as applying to all the software functions included in path 1 from call paths 600 in FIG. 6. As a result, testing module 110 may be able to fully test all of those software functions included in path 1 by executing just one of "S4" and "S33". In other words, "S4" and "S33"

may have overlapping testing coverage such that only one of these functions needs to be executed to test path 1.

Accordingly, identification module 104 may optimize the number of test scripts needed to perform the regression test on path 1 by refusing to execute the other test script. For example, identification module 104 may identify and/or select test script "S4", but not test script "S33", for execution in connection with path 1. In other words, identification module 104 may minimize the number of test scripts needed to perform the regression test on path 1. Identification module 104 may continue optimizing the regression test and/or minimizing the number of test scripts needed to perform the regression test in these ways, thereby improving the efficiency of the regression test and/or eliminating superfluous testing.

In some examples, identification module 104 may identify and/or select certain test scripts based at least in part on preference scores. In one example, some test scripts may have been assigned preference scores that indicate preferences among the test scripts. For example, test script "S4" may have been assigned a preference score of "10", and test script "S33" may have been assigned a preference score of "5". In this example, the higher score may indicate preference over the lower score. As a result, test script "S4" may be preferred over test script "S33".

Accordingly, identification module 104 may identify the preference scores assigned to test scripts "S4" and "S33". Determination module 106 may then determine that test script "S4" is preferred over test script "S33" due at least in part to their respective preference scores. In response to this determination, identification module 104 may select test script "S4", instead of test script "S33", to be executed as part of the regression test.

In some examples, identification module 104 may optimize the regression testing by identifying and/or selecting certain test scripts (to the exclusion of other test scripts) based at least in part on path parameters and/or weighting criteria. Examples of such path parameters include, without limitation, a maximum number of test scripts to validate each call path, execution times of the test scripts, historical pass rates of the test scripts, specific test domains of the test scripts, release dates of the test scripts, variations and/or combinations of one or more of the same, and/or any other suitable parameters.

In one example, determination module 106 may determine the number of software functions included in each of the call paths. In this example, determination module 106 may determine which of the call paths include the lowest number of software functions. Identification module 104 may then optimize the test scripts needed to perform regression testing on those call paths with the lowest depths. Upon completing this optimization, identification module 104 may select those optimized test scripts (to the exclusion of other redundant test scripts) to be executed as part of the regression test.

In another example, determination module 106 may determine the number of function calls made to each software function included in the call paths. In this example, determination module 106 may calculate the total weight of each of the call paths by summing and/or adding up the number of function calls made to each software function included in the call paths. Determination module 106 may then determine which of the call paths have the highest total weights. In response to this determination, identification module 104 may optimize the test scripts needed to perform regression testing on those call paths with the highest total weights. Upon completing this optimization, identification module 104 may select those optimized test scripts (to the exclusion of other redundant test scripts) to be executed as part of the regression test.

Similarly, determination module 106 may determine the number of function calls made by each software function included in the call paths. In this example, determination module 106 may calculate the total weight of each of the call paths by summing and/or adding up the number of function calls made by each software function included in the call paths. Determination module 106 may then determine which of the call paths have the highest total weights. In response to this determination, identification module 104 may optimize the test scripts needed to perform regression testing on those call paths with the highest total weights. Upon completing this optimization, identification module 104 may select those optimized test scripts (to the exclusion of other redundant test scripts) to be executed as part of the regression test.

Figure 8:
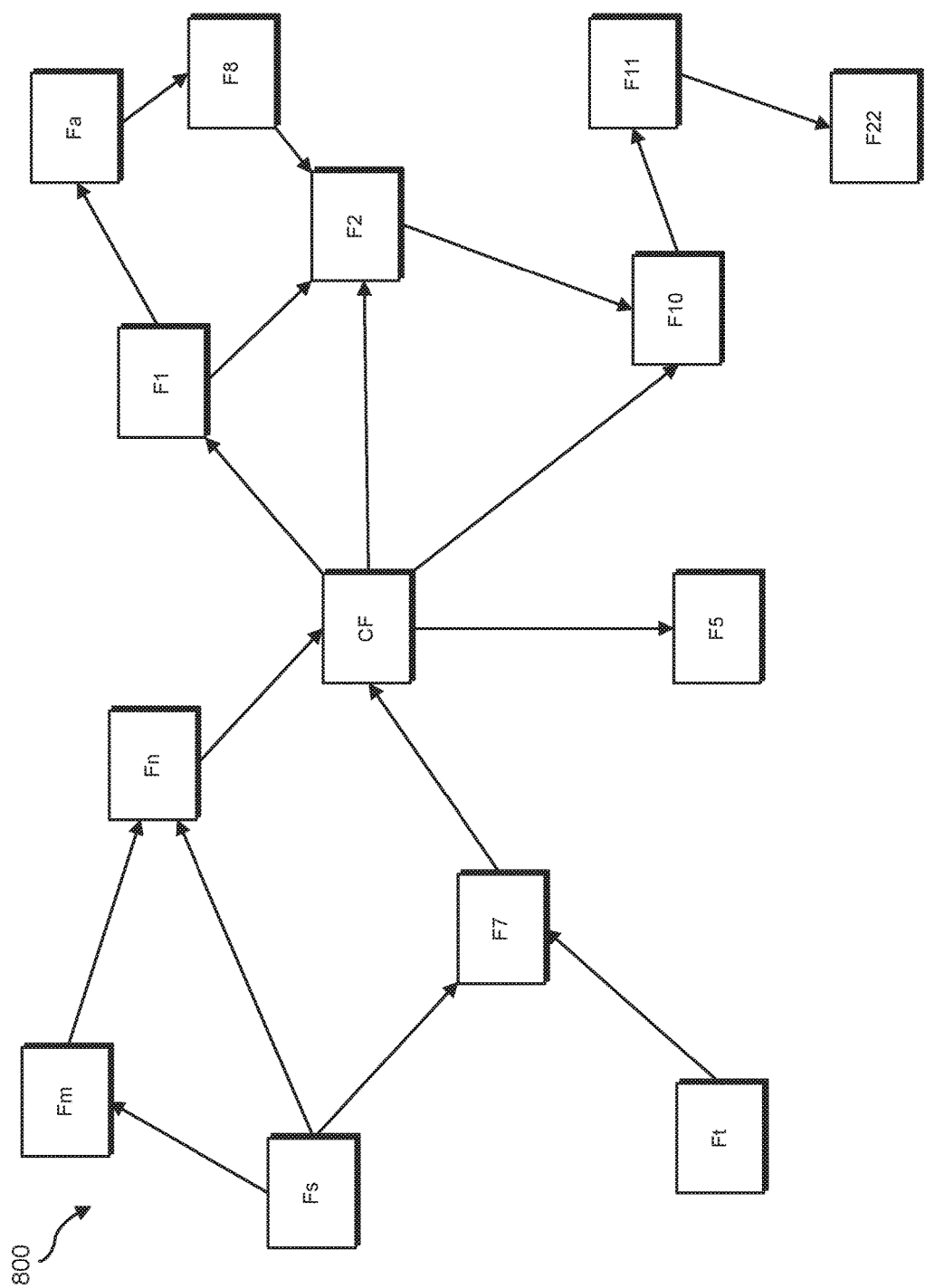
FIG. 8 is an illustration of exemplary optimized per-path script sets.

FIG. 8 illustrates an exemplary call graph 800. As illustrated in FIG. 6, call graph 800 may include various nodes that represent certain software functions included in software update 120. In this example, the arrows connecting one node to another may indicate the relationship between the corresponding software functions. For example, the node representing software function "Fs" may point to the node representing software function "Fm" via an arrow. In this example, the direction of the arrow may indicate that "Fs" calls "Fm" or, in other words, that "Fs" is the caller function and "Fm" is the callee function.

As a specific example with reference to call graph 800 in FIG. 8, determination module 106 may determine that the call path "Fs→Fn→CF" includes 3 different software functions. Accordingly, the "Fs→Fn→CF" call path may have a depth of 3. In this example, determination module 106 may also determine that the call path "Fs→Fm→Fn→CF" includes 4 different software functions and/or has a depth of 4. Similarly, determination module 106 may determine that the call path "CF→F1→Fa→F8→F2→F10→F11→F22" includes 8 different software functions and/or has a depth of 8.

In response to these determinations, identification module 104 may identify and/or select a certain number of call paths with the lowest depths. For example, identification module 104 may identify and/or select the top 5 lowest depth paths or, in other words, the 5 call paths with the lowest depths. Identification module 104 may then optimize the test scripts needed to perform regression testing on those 5 call paths with the lowest depths. Upon completing this optimization, identification module 104 may select those optimized test scripts (to the exclusion of other redundant test scripts) to be executed as part of the regression test.

As another example with reference to call graph 800 in FIG. 8, determination module 106 may determine that the number of function calls made by "Fs" is 3, the number of function calls made by "Fn" is 1, and the number of function calls made by "CF" is 1. In this example, determination module 106 may calculate the total weight of call path "Fs→Fn→CF" as being 3+1+4=8. Similarly, determination module 106 may determine that the number of function calls made by "Fm" is 1. As a result, determination module 106 may calculate the total weight of call path "Fs→Fm→Fn→CF" as being 3+1+1+4=9. Identification module 104 may select the "Fs→Fm→Fn→CF" call path over the "Fs→Fn→CF" call path as part of optimization due at least in part to the "Fs→Fm→Fn→CF" call path having a higher total weight. Additionally or alternatively, identification module 104 may select a certain number of the call paths (e.g., the top 4 call paths) that have the highest total weights.

As a further example with reference to call graph 800 in FIG. 8, determination module 106 may determine that the number of function calls made to "Fs" is 0, the number of function calls made to "Fn" is 2, and the number of function calls made to "CF" is 2. In this example, determination module 106 may calculate the total weight of call path "Fs→Fn→CF" as being 0+2+2=4. Similarly, determination module 106 may determine that the number of function calls made to "Fm" is 1. As a result, determination module 106 may calculate the total weight of call path "Fs→Fm→Fn→CF" as being 0+1+2+2=5. Identification module 104 may select the "Fs→Fm→Fn→CF" call path over the "Fs→Fn→CF" call path as part of the optimization due at least in part to the "Fs→Fm→Fn→CF" call path having a higher total weight. Additionally or alternatively, identification module 104 may select a certain number of the call paths (e.g., the top 4 call paths) that have the highest total weights.

Returning to FIG. 3, at step 360 one or more of the systems described herein may perform a regression test on the changed software function and the additional software function by executing the test script that is mapped to both the changed software function and the additional software function. For example, testing module 110 may, as part of server 206 in FIG. 2, perform a regression test on the changed software function and the additional software function by executing the test script that is mapped to of those software functions. As part of this regression test, testing module 110 may avoid executing other test scripts due at least in part to certain testing redundancies even though those other test scripts may apply to the changed software function and the additional software function.

The systems described herein may perform step 360 in a variety of ways and/or contexts. In some examples, testing module 110 may perform the regression test on software update 120 by executing those scripts selected and/or optimized by identification module 104 in connection with step 350 described above. In one example, testing module 110 may refuse to execute all other scripts that were not selected by identification module 104 as part of the optimization in connection with step 350 described above.

In some examples, testing module 110 may limit the number of test scripts executed as part of the regression test to the optimized test scripts that apply to the changed software function and all other software functions implicated by the changed software function. In other examples, testing module 110 may limit the regression test to being performed only on the implicated call paths with the lowest number of functions and/or with the lowest depths. In further examples, testing module 110 may limit the regression test to being performed only on the implicated call paths with the highest total weights. In addition, testing module 110 may limit the number of test scripts that are executed in connection with each call path as part of the regression test based at least in part on one or more path parameters, such as a maximum number of test scripts, execution times, historical pass rates, specific test domains, release dates, etc.

In some examples, upon completion of the regression test, server 206 may distribute, deliver, and/or release software update 120 to computing devices 202(1)-(N) for implementation. Computing devices 202(1)-(N) may then implement software update 120 by updating the corresponding software product based on software update 120 and/or executing software update 120.

Figure 9:
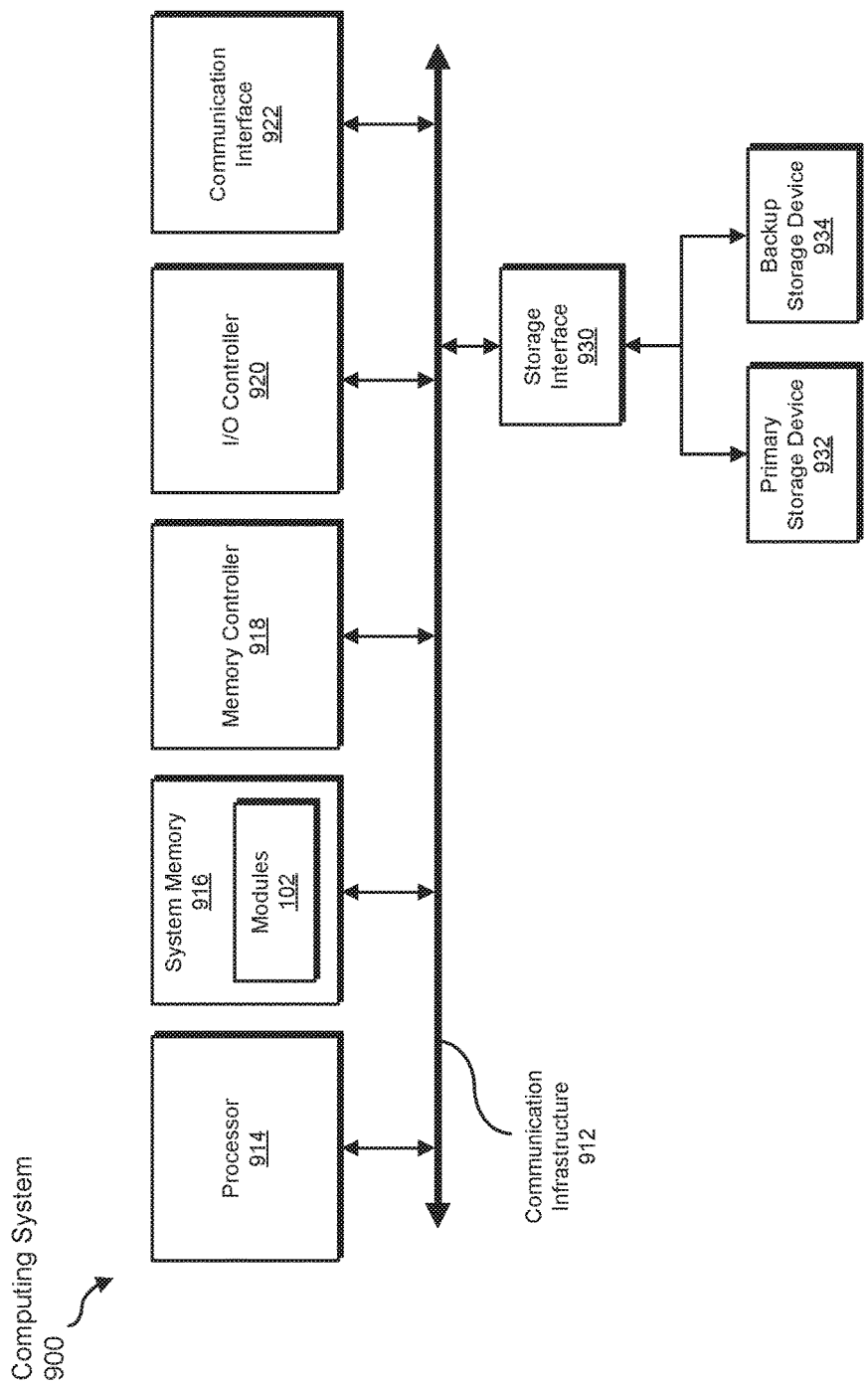
FIG. 9 is a block diagram of an exemplary computing system capable of implementing and/or being used in connection with one or more of the embodiments described and/or illustrated herein.

FIG. 9 is a block diagram of an exemplary computing system 900 capable of implementing and/or being used in connection with one or more of the embodiments described and/or illustrated herein. In some embodiments, all or a portion of computing system 900 may perform and/or be a means for performing, either alone or in combination with other elements, one or more of the steps described in connection with FIG. 3. All or a portion of computing system 900 may also perform and/or be a means for performing and/or implementing any other steps, methods, or processes described and/or illustrated herein.

Computing system 900 broadly represents any type or form of electrical load, including a single or multi-processor computing device or system capable of executing computer-readable instructions. Examples of computing system 900 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 900 may be programmed, configured, and/or otherwise designed to comply with one or more networking protocols. According to certain embodiments, computing system 900 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 900 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 900 may include various network and/or computing components. For example, computing system 900 may include at least one processor 914 and a system memory 916. Processor 914 generally represents any type or form of processing unit capable of processing data or interpreting and executing instructions. For example, processor 914 may represent an application-specific integrated circuit (ASIC), a system on a chip (e.g., a network processor), a hardware accelerator, a general purpose processor, and/or any other suitable processing element.

Processor 914 may process data according to one or more of the networking protocols discussed above. For example, processor 914 may execute or implement a portion of a protocol stack, may process packets, may perform memory operations (e.g., queuing packets for later processing), may execute end-user applications, and/or may perform any other processing tasks.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 900 may include both a volatile memory unit (such as, for example, system memory 916) and a non-volatile storage device (such as, for example, primary storage device 932, as described in detail below). System memory 916 may be implemented as shared memory and/or distributed memory in a network device. Furthermore, system memory 916 may store packets and/or other information used in networking operations.

In certain embodiments, exemplary computing system 900 may also include one or more components or elements in addition to processor 914 and system memory 916. For example, as illustrated in FIG. 9, computing system 900 may include a memory controller 918, an Input/Output (I/O) controller 920, and a communication interface 922, each of which may be interconnected via communication infrastructure 912. Communication infrastructure 912 generally represents any type or form of infrastructure capable of facilitating communication between one or more components of a computing device. Examples of communication infrastructure 912 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 918 generally represents any type or form of device capable of handling memory or data or controlling communication between one or more components of computing system 900. For example, in certain embodiments memory controller 918 may control communication between processor 914, system memory 916, and I/O controller 920 via communication infrastructure 912. In some embodiments, memory controller 918 may include a Direct Memory Access (DMA) unit that may transfer data (e.g., packets) to or from a link adapter.

I/O controller 920 generally represents any type or form of device or module capable of coordinating and/or controlling the input and output functions of a computing device. For example, in certain embodiments I/O controller 920 may control or facilitate transfer of data between one or more elements of computing system 900, such as processor 914, system memory 916, communication interface 922, and storage interface 930.

Communication interface 922 broadly represents any type or form of communication device or adapter capable of facilitating communication between exemplary computing system 900 and one or more additional devices. For example, in certain embodiments communication interface 922 may facilitate communication between computing system 900 and a private or public network including additional computing systems. Examples of communication interface 922 include, without limitation, a link adapter, a wired network interface (such as a network interface card), a wireless network interface (such as a wireless network interface card), and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 922 may also represent a host adapter configured to facilitate communication between computing system 900 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also enable computing system 900 to engage in distributed or remote computing. For example, communication interface 922 may receive instructions from a remote device or send instructions to a remote device for execution.

As illustrated in FIG. 9, exemplary computing system 900 may also include a primary storage device 932 and/or a backup storage device 934 coupled to communication infrastructure 912 via a storage interface 930. Storage devices 932 and 934 generally represent any type or form of storage device or medium capable of storing data and/or other computer-readable instructions. For example, storage devices 932 and 934 may represent a magnetic disk drive (e.g., a so-called hard drive), a solid state drive, a floppy disk drive, a magnetic tape drive, an optical disk drive, a flash drive, or the like. Storage interface 930 generally represents any type or form of interface or device for transferring data between storage devices 932 and 934 and other components of computing system 900.

In certain embodiments, storage devices 932 and 934 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 934 may also include other similar structures or devices for allowing computer software, data, or other computer-readable instructions to be loaded into computing system 900. For example, storage devices 932 and 934 may be configured to read and write software, data, or other computer-readable information. Storage devices 932 and 934 may be a part of computing system 900 or may be separate devices accessed through other interface systems.

Many other devices or subsystems may be connected to computing system 900. Conversely, all of the components and devices illustrated in FIG. 9 need not be present to practice the embodiments described and/or illustrated herein. The devices and subsystems referenced above may also be interconnected in different ways from those shown in FIG. 9. Computing system 900 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
identifying a software update that includes at least one software function that has changed since a previous software update;
determining, based at least in part on the software update, one or more call paths that include:
the software function that has changed since the previous software update; and
at least one additional software function;
determining the number of function calls made to each software function included in each of the call paths;
calculating a total weight of each of the call paths by summing the number of function calls made to each software function included in each of the call paths;
determining which of the call paths have the highest total weights;
mapping the changed software function to one or more test scripts that facilitate verifying whether the changed software function performs a certain task despite having changed since the previous software update;
mapping the additional software function to one or more additional test scripts that facilitate verifying whether the additional software function performs a specific task even though the changed software function has changed since the previous software update;
identifying at least one test script that is common to both the test scripts mapped to the changed software function and the additional test scripts mapped to the additional software function;
performing a regression test on the changed software function and the additional software function by executing the test script that is mapped to both the changed software function and the additional software function; and
limiting the regression test to being performed only on the call paths that have the highest total weights.

2. The method of claim 1, wherein each call path comprises a set of software functions that, when executed, invokes the changed software function.

3. The method of claim 2, wherein the changed software function represents at least one of:
the first software function invoked when the set of software functions is executed; and
the last software function invoked when the set of software functions is executed.

4. The method of claim 1, wherein:
the additional software function comprises a plurality of additional software functions; and
identifying the test script that is common to both the test scripts mapped to the changed software function and the additional test scripts mapped to the additional software function comprises:
determining which test script is most commonly mapped to the changed software function and the additional software functions; and
selecting the most commonly mapped test script to be executed as part of the regression test performed on the changed software function and the additional software function.

5. The method of claim 1, wherein the software update includes at least one other software function that has changed since the previous software update;
further comprising:
determining, based at least in part on the software update, one or more other call paths that include:

the other software function that has changed since the previous software update; and
at least one further software function;
mapping the other changed software function to one or more other test scripts that facilitate verifying whether the other changed software function performs a particular task despite having changed since the previous software update; and
mapping the further software function to one or more further test scripts that facilitate verifying whether the further software function performs a specific task even though the other changed software function has changed since the previous software update; and
wherein identifying the test script that is common to both the test scripts mapped to the changed software function and the additional test scripts mapped to the additional software function comprises determining that the test script is mapped to:
the changed software function;
the additional software function;
the other changed software function; and
the further software function.

6. The method of claim 5, wherein performing the regression test on the changed software function and the additional software function comprises performing the regression test on the changed software function, the additional software function, the other changed software function, and the further software function by executing the test script that is mapped to all of the changed software function, the additional software function, the other changed software function, and the further software function.

7. The method of claim 1, wherein:
the additional software function comprises a plurality of additional software functions;
the test script that is common to both the test scripts mapped to the changed software function and the additional test scripts mapped to the additional software function comprises a plurality of test scripts that are common to both the test scripts mapped to the changed software function and the additional test scripts mapped to the additional software function; and
identifying the test script that is common to both the test scripts mapped to the changed software function and the additional test scripts mapped to the additional software function comprises:
identifying at least one testing redundancy among the plurality of test scripts in connection with the changed software function and the additional software function; and
optimizing the number of test scripts needed to perform the regression test on the changed software function and all of the plurality of additional software functions by refusing to execute one or more of the plurality of test scripts as part of the regression test due at least in part to the testing redundancy identified among the plurality of test scripts.

8. The method of claim 7, wherein:
determining the call paths comprises determining all of the call paths that include:
the changed software function; and
all other software functions implicated by the changed software function; and
optimizing the number of test scripts needed to perform the regression test on the changed software function and all of the plurality of additional software functions comprises minimizing the number of test scripts needed to perform the regression test on the changed software function and all the other software functions implicated by the changed software function.

9. The method of claim 1, wherein:
the test script that is common to both the test scripts mapped to the changed software function and the additional test scripts mapped to the additional software function comprises a plurality of test scripts that are common to both the test scripts mapped to the changed software function and the additional test scripts mapped to the additional software function; and
identifying the test script that is common to both the test scripts mapped to the changed software function and the additional test scripts mapped to the additional software function comprises:
identifying a plurality of preference scores that correspond to the plurality of test scripts;
determining, based at least in part on the plurality of preference scores, which of the plurality of test scripts has the highest preference score; and
selecting the test script that has the highest preference score to be executed as part of the regression test.

10. The method of claim 1, wherein:
determining the call paths comprises:
determining the number of software functions included in each of the call paths; and
determining which of the call paths include the lowest number of software functions; and
performing the regression test on the changed software function and the additional software function comprises limiting the regression test to being performed only on the call paths that include the lowest number of functions.

11. The method of claim 1, wherein:
the test script that is common to both the test scripts mapped to the changed software function and the additional test scripts mapped to the additional software function comprises a plurality of test scripts that are common to both the test scripts mapped to the changed software function and the additional test scripts mapped to the additional software function; and
performing the regression test on the changed software function and the additional software function comprises limiting the number of test scripts that are executed in connection with each call path as part of the regression test based at least in part on one or more parameters.

12. The method of claim 11, wherein the parameters comprise at least one of:
a maximum number of test scripts to validate each call path;
execution times of the test scripts;
historical pass rates of the test scripts;
specific test domains of the test scripts; and
release dates of the test scripts.

13. A system comprising:
an identification module, stored in memory, that identifies a software update that includes at least one software function that has changed since a previous software update;
a determination module, stored in memory, that:
determines, based at least in part on the software update, one or more call paths that include:
the software function that has changed since the previous software update; and
at least one additional software function;
determines the number of function calls made to each software function included in each of the call paths;

calculates a total weight of each of the call paths by summing the number of function calls made to each software function included in each of the call paths; and determines which of the call paths have the highest total weights;

a mapping module, stored in memory, that:

maps the changed software function to one or more test scripts that facilitate verifying whether the changed software function performs a certain task despite having changed since the previous software update; and maps the additional software function to one or more additional test scripts that facilitate verifying whether the additional software function performs a specific task even though the changed software function has changed since the previous software update;

wherein the identification module identifies at least one test script that is common to both the test scripts mapped to the changed software function and the additional test scripts mapped to the additional software function;

a testing module, stored in memory, that:

performs a regression test on the changed software function and the additional software function by executing the test script that is mapped to both the changed software function and the additional software function; and limits the regression test to being performed only on the call paths that have the highest total weights; and at least one physical processor that executes the identification module, the determination module, the mapping module, and the testing module.

14. The system of claim 13, wherein each call path comprises a set of software functions that, when executed, invokes the changed software function.

15. The system of claim 14, wherein the changed software function represents at least one of:

the first software function invoked when the set of software functions is executed; and the last software function invoked when the set of software functions is executed.

16. The system of claim 13, wherein:

the additional software function comprises a plurality of additional software functions;

the determination module determines which test script is most commonly mapped to the changed software function and the additional software functions; and the testing module selects the most commonly mapped test script to be executed as part of the regression test performed on the changed software function and the additional software function.

17. The system of claim 13, wherein:

the software update includes at least one other software function that has changed since the previous software update;

the determination module determines, based at least in part on the software update, one or more other call paths that include:

the other software function that has changed since the previous software update; and at least one further software function;

the mapping module:

maps the other changed software function to one or more other test scripts that facilitate verifying whether the other changed software function performs a particular task despite having changed since the previous software update; and maps the further software function to one or more further test scripts that facilitate verifying whether the further software function performs a specific task even though the other changed software function has changed since the previous software update; and wherein the identification module identifies the test script that is common to both the test scripts mapped to the changed software function and the additional test scripts mapped to the additional software function comprises determining that the test script is mapped to:

the changed software function;

the additional software function;

the other changed software function; and the further software function.

18. The system of claim 17, wherein the testing module performs the regression test on the changed software function, the additional software function, the other changed software function, and the further software function by executing the test script that is mapped to all of the changed software function, the additional software function, the other changed software function, and the further software function.

19. A non-transitory computer-readable-storage medium comprising one or more computer-executable instructions that, when executed by at least one processor of a computing device, cause the computing device to:

identify a software update that includes at least one software function that has changed since a previous software update;

determine, based at least in part on the software update, one or more call paths that include:

the software function that has changed since the previous software update; and at least one additional software function;

determine the number of function calls made to each software function included in each of the call paths;

calculate a total weight of each of the call paths by summing the number of function calls made to each software function included in each of the call paths;

determine which of the call paths have the highest total weights;

map the changed software function to one or more test scripts that facilitate verifying whether the changed software function performs a certain task despite having changed since the previous software update;

map the additional software function to one or more additional test scripts that facilitate verifying whether the additional software function performs a specific task even though the changed software function has changed since the previous software update;

identify at least one test script that is common to both the test scripts mapped to the changed software function and the additional test scripts mapped to the additional software function;

perform a regression test on the changed software function and the additional software function by executing the test script that is mapped to both the changed software function and the additional software function; and limit the regression test to being performed only on the call paths that have the highest total weights.

* * * * *